Sept. 22, 1931.  C. TIMPERIO  1,824,637
RAIL JOINT
Filed April 9, 1931
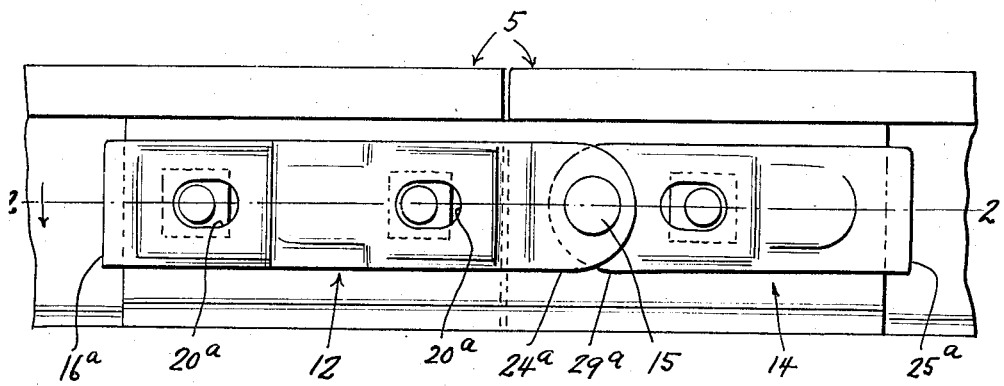
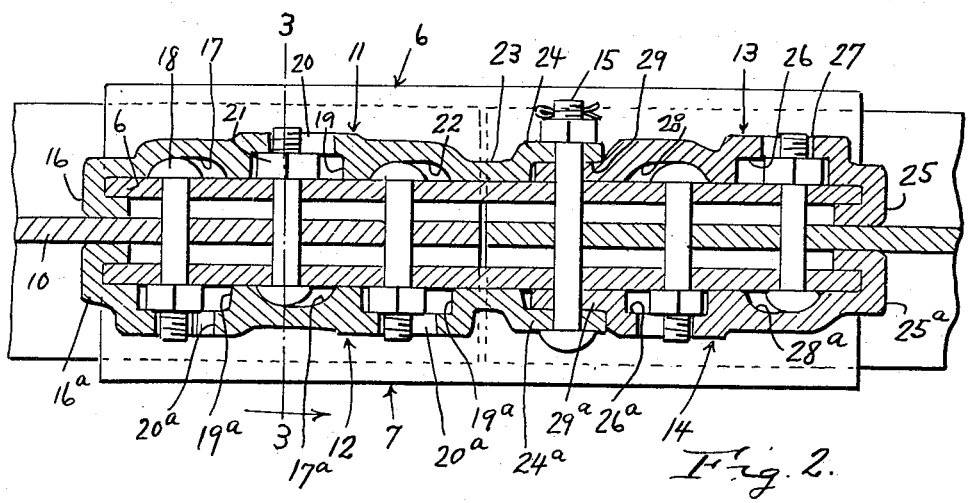
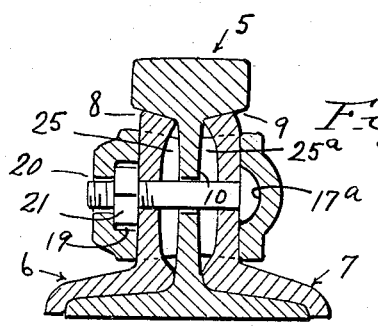
Inventor
Carmino Timperio
By Clarence A. O'Brien
Attorney Patented Sept. 22, 1931

1,824,637

UNITED STATES PATENT OFFICE

CARMINO TIMPERIO, OF NEW GENEVA, PENNSYLVANIA

RAIL JOINT

Application filed April 9, 1931. Serial No. 528,879.

This invention relates generally to rail joints and means for protecting and securing the same against separation or spreading through the coming loose of the fish plates consequent upon the displacement of bolts holding the same.

It is an object of this invention to provide a device of the character described of unusual simplicity and ease of installation, which will be very effective not only in preventing the shifting of the fish plates, but which positively prevents the inadvertent displacement of the bolts of the joints.

These and other objects of the invention, its nature, and its composition and arrangement and combination of parts will be readily understood by anyone acquainted with the art to which this invention relates upon consulting the following descriptions of the drawings, in which:—

Figure 1 is a general side elevational view of a rail joint showing the device of my invention installed thereupon.

Figure 2 is a horizontal cross sectional view looking downwardly in the direction of the arrow approximately on the line 2—2 of Figure 1.

Figure 3 is a transverse vertical cross sectional view approximately on the line 3—3 of Figure 2 looking in the direction of the arrow.

Referring in detail to the drawing, the numeral 5 refers to each of a pair of rail ends, and the numerals 6, 7 refer to angular fish plates. The fish plates are of a type to engage under the flange of the rail as at 8 and 9, and to be spaced from the web 10 of the rail as seen in Figures 2 and 3, the lower flange portion of the fish plate adapted to rest upon and to conform to the base of the rail as seen in the drawings. As illustrated, the purpose of the invention is to provide a guard on each side of the rail and outward of a fish plate and so assembled as to be locked against displacement by a single bolt, in such manner and so constructed as to prevent displacement of the remaining bolts of the joint. I accomplish this purpose by providing opposed pairs of bodies 11, 12, 13 and 14 assembled together by the main bolt 15, which replaces one of the regulation bolts of the joint as appears in Figure 2 where it is shown to be of a greater length than the regulation bolts and provided with a nut locking means exterior of the fish plates.

The body 11 consists of an elongated narrow plate of considerable thickness which has at one end, that is the outward end thereof a hooked formation 16 adapted to engage around the end of the fish plate 6 and between the fish plate and the web 10 of the rail. Inwardly of the hooked portion 16 there is an oval recess 17 adapted to permit movement in one direction of the body 11 with respect to the round head of a bolt passing through the fish plate and the web of the rail and through the fish plate of the other side. Further inwardly of the recess 17 there is provided a rectangular recess 19 which has an oval opening 20. The recess 19 is adapted to accommodate a nut 21 of another of the bolts of the rail joint, and the aperture 20 is adapted to permit projecting of the end of the bolts through the body 11. The aperture 20 is large enough to permit passage of the nut 21, and the recess 19 being larger than the opening 20 permits the nut to seat under a shoulder formed by the recess 19 and the opening 20 as seen in Figure 2. Further inwardly of the recess 19 there is another oval recess 22 similar in all respects to the recess 17. Inwardly of the recess 22 is a straight fish plate engaging portion 23 which has on its inward end an offset parallel portion 24 apertured to receive one end of the bolt 15.

The body 12 is similar in all respects to the body 11 except that where the body 11 has the oval recesses, the body 12 has the rectangular recesses similar to that described and alluded to as recess 19 of the body 11. This arrangement is made so that where a head 18 of the bolt is accommodated in an oval recess 17, the other end of the bolt and its nut must necessarily be accommodated in a rectangular recess 19a having the opening 20a as shown in the drawings.

The remaining half of the joint is composed of a pair of relatively shorter plates 13 and 14 already alluded to. Because of the practice of alternating the direction of projection of the bolts in a rail joint, it will be seen that in the arrangement prescribed herein that the bolt accommodating formations of the plates 13 and 14 will alternate in the same manner as described in the cases of plates 6 and 12 and 11. The plate 13 is provided at its outward end with the hooked portion 25, inward of which is the nut accommodating recess 26 having the bolt end accommodating opening 27 of the same type as described at 19 in respect the plate 11. Inwardly of the recess 26 is an oval recess 28 of the same type as that described with respect of the oval recesses 17 and 22 of the plate 11. Inwardly of the recess 28 is a flattened or straight fish plate engaging portion 29 similar to the fish plate engaging portion 23 of the plate 11. The inward end of the portion 29 does not have an offset in the form of that described at 24, but the portion 29 engages under the offset 24 and is apertured to register with the opening in the offset portion 24 to accommodate the bolt 15.

The plate 14 is the same in general formation to the plate 13 except that opposite the recess 26 there is an oval recess 28a and opposite the oval recess 28 in the plate 13 there is a rectangular recess 26a in the plate 14, and inwardly of the rectangular recess 26a in the straight portion 29a for engaging under the offset 24a of the companion plate 12. Through the offset 24a and the portion 29a the bolt 15 passes, and the nut thereof is prevented from accidental displacement by the use of a cotter pin or other locking means readily removable.

It will be observed that the horizontal elongation of the recesses whether oval or rectangular, permit the slipping of the hooked ends 16. 16a, and 25 and 25a around the ends of the fish plates, and the plates are then pushed toward each other so as to completely engage the hooked portions about the ends of the fish plates, and the bolt 15 is then slipped into position, and the removal of the plates is just as simple and expeditious, through the removal of the bolt 15. It will be obvious that the snug engagement of the boundaries of the recesses will confine either the head or the nut, or both, of the bolts constituting the joint, and prevent their coming loose and being misplaced, and it is impossible that the plates have longitudinal separation without the removal of the bolt 15. As already stated, the bolt 15 has its nut locked against accidental displacement.

Thus it will be seen that I have provided a rail joint guard of the type described which is not only simple in construction and therefore inexpensive, but which has a structure and formation and method of assembly which renders it extraordinarily easy to install and remove. Such a provision is believed to be important, because the ordinary types of rail joints are not as easy or as quickly removable and installable as the device herein described, and this is believed to be of substantial contribution to the art.

It is to be definitely understood that I do not desire to limit the application of this invention to the particular modification set out herein to illustrate the principles thereof, and any change or changes may be made in material and structure and arrangement of parts consistent with the spirit and scope of the invention.

What is claimed is:—

1. A rail joint guard of the type described comprising, recessed bodies adapted to be assembled in pairs on each side of a rail joint by hooking about the ends of the fish plates of the joint and abutting the head and nut of each bolt of the rail joint whereby to prevent their accidental displacement, and a single bolt passing through the bodies, the fish plates and the web of the rail to assemble the guard on the rail joint.

2. A rail joint guard of the type described comprising, recessed bodies adapted to be assembled in pairs on each side of a rail joint by hooking about the ends of the fish plates of the joint and abutting the head and nut of each bolt of the rail joint whereby to prevent their accidental displacement, and a single bolt passing through the bodies, the fish plates and the web of the rail to assemble the guard on the rail joint, said single bolt being a replacement for an existent rail joint bolt.

3. A rail joint guard of the type described comprising, recessed bodies adapted to be assembled in pairs on each side of a rail joint by hooking about the ends of the fish plates of the joint and abutting the head and nut of each bolt of the rail joint whereby to prevent their accidental displacement, and a single bolt passing through the bodies, the fish plates and the web of the rail to assemble the guard on the rail joint, said single bolt being adapted to displace an existent rail joint bolt, for this purpose said bodies being formed to prevent turning of the nuts of said existent bolts when in place on the rail joint.

In testimony whereof, I affix my signature.

CARMINO TIMPERIO.